June 3, 1952  L. F. TRENCZAK  2,598,948
MINING MACHINE

Filed Feb. 24, 1949   2 SHEETS—SHEET 1

Ladislaus Franz Trenczak
INVENTOR

BY Robert E. Burns
ATTORNEY

June 3, 1952  L. F. TRENCZAK  2,598,948
MINING MACHINE

Filed Feb. 24, 1949  2 SHEETS—SHEET 2

Ladislaus Franz Trenczak
INVENTOR

BY
ATTORNEY

Patented June 3, 1952

2,598,948

UNITED STATES PATENT OFFICE 2,598,948

MINING MACHINE

Ladislaus Franz Trenczak, Graz, Austria

Application February 24, 1949, Serial No. 78,220
In Austria March 12, 1948

4 Claims. (Cl. 262—9)

The invention relates to an apparatus for the extraction of minerals and particularly mineral coal and brown coal in underground mines by means of cutting machines.

Cutting machines are known, which consist of cutting rollers or cutting chains or combinations of cutting rollers and cutting chains. Moreover cutting machines are known which are combined with conveying apparatus; for example the cutting apparatus consists of a vertically disposed cutting chain and two horizontally disposed cutting rollers, while the conveying apparatus consists in primitive fashion of two rotating racks, which in most cases fail because the coal is so firm or is in such large lumps that they cannot act. In those machines which consist of two parts, one part must also be replaced ahead of the other at the end of an "up" or "down" trip, and for this purpose must be dismantled, which means very great losses of time and output.

Separate extraction and loading devices, built after the style of ploughs, are also already known, in which the plough bodies have cutting edges which strike against the coal seam with the aid of a compressed air drive, which, however, apart from relatively small output of these machines, involves an enormously great consumption of material, i. e. wear and tear, in the case of hard coal. The safety of the miners at the coal face is also greatly emperilled by these machines, which work with very considerable noise, because the miners cannot hear the warning sound of breaking wood before the roof gives way, and owing to the tremendous vibration which this machine sets up on the rock, the latter collapses more easily and more frequently than in the case of cutting machines which work quietly and steadily.

The present invention consists essentially in disposing the driving apparatus of the cutting machine inside the space cut out by the latter, under cover of a casing which, through being formed in the shape of a ploughshare, carries away laterally the material cut away by the cutting machine. The apparatus of the invention thus acts simultaneously as a coal-cutting machine and as a conveying machine, which ejects laterally the material cut by the cutting machine, for example the coal cut out of the coal seam.

By virtue of the fact that the driving apparatus lies inside the space cut out by the cutting machine in the coal seam or the like, the space directly adjacent to the cutting machine is kept clear. The apparatus of the invention therefore makes possible a particularly simplified method of working, in which according to the invention, the cutting machine is guided on its working path at the side of a conveyor belt and the material thrown out laterally from the cutting machine is guided on to the conveyor belt direct simply through the action of the ploughshare-shaped casing of the driving apparatus.

This ploughshare-shaped casing which conveniently forms a part of a housing of the driving unit consisting of motor and gearing, is joined at the ejection side facing the conveyor band, near the floor, by a body which has guide surfaces rising obliquely outwards and by which material carried out of the space between the cutting machine and the boarding is raised to the corresponding level to the conveyor belt.

The cutting machine is equipped symmetrically with cutting devices which are disposed on the two sides of the driving unit and which can be operated at will in accordance with the direction of advance, and with ploughshare-shaped casings on both sides of the driving unit. In this way the machine can advance similarly in both directions. At the ends of its working path, the cutting machine is in each case displaced laterally and parallel, for example on a slide, by a distance equal to its working width, and brought back into operation with the reverse advance. In order to permit completely continuous working without loss of time at the turning point it is possible, in proportion to the forward movement of the cutting machine, to erect a second conveyor belt on the path freed by the cutting machine, which belt comes into operation during the next working path of the cutting machine.

By virtue of the direct ejection of the material by the cutting machine itself on to the conveyor belt guided close by the machine and by virtue of the continuous method of working with no loss of time at the turning point, made possible by the symmetrical, double-action design of the machine, a conveying output is achieved which far exceeds the output of known cutting machines. The automatic working of the cutting machine in direct co-operation with the conveyor belt enables a substantial reduction to be made in the operating-crew whose duties now consist only of attending to timbering and walling for safety purposes behind the machine, assembling the new conveyor belt, and moving the machine laterally into its new working position at the turning points of the working path. In this way the invention permits the output in tons per miner to be multiplied and also permits extensive rationalisation of working. In addition, the invention permits the complete elimination of dangerous blasting at the working faces tackled by the crew as well as the troublesome preliminary drilling which, particularly in fire damp pits, in which, as is known, the catastrophic fire damp explosions are for the most part due to careless blasting work, means a very substantial improvement of the safety of miners.

Figure 1:
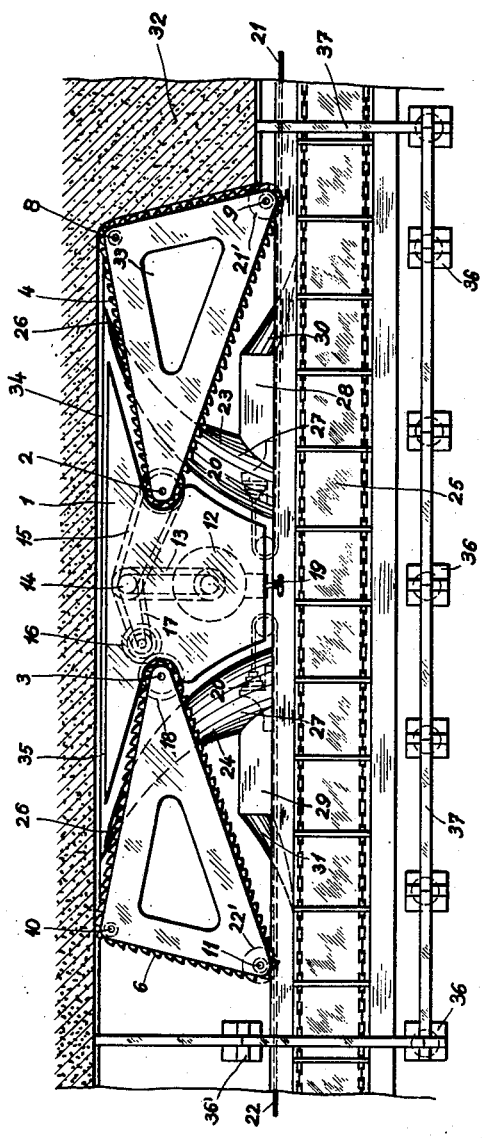
Figs. 1, 2 and 3 show one embodiment of apparatus in accordance with the invention in plan, elevation and cross elevation respectively.
Figure 2:
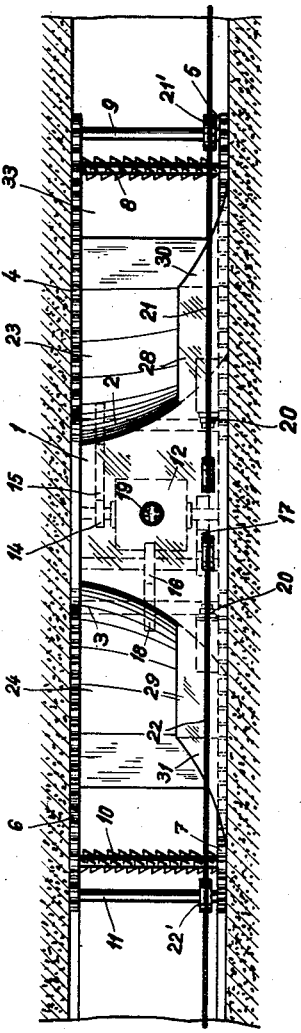
Figure 3:
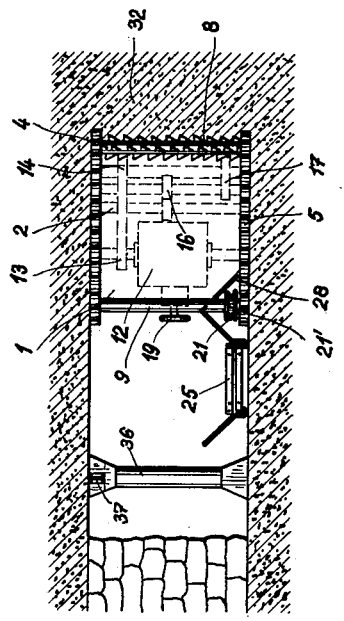

The cutting machine has a housing 1, which encloses the driving unit. On the housing are pivoted cutting frames which are rockable about axles 2 and 3 and carry cutting chains 4, 5, 6, and 7. The projecting ends of the upper and lower cutting frames are connected by shafts 8 and 9, and 10 and 11 respectively, of which the shafts 8 and 9 are designed as cutting shafts. The cutting chains and cutting shafts are driven through the shafts 2 and 3, which form the pivot axles, by a motor 12. From the motor 12 the drive is taken through a chain 13 to a gearing 14 and thence through a chain 15 to the shaft 2. In the drive of the cutting chain and of the cutting cylinder 10 is inserted an intermediate wheel 16 which acts as a reversing gear and which is driven through a chain 17 and is in engagement with a toothed wheel 18 disposed on the shaft 3. A handwheel 18 serves to control the drive, for which purpose, depending on the direction of advance, the right-hand cutting apparatus 4, 5, 8 or the left-hand cutting apparatus 6, 7, 10 can be connected to the drive or disconnected therefrom.

On the housing 1 are fastened, through the medium of springs 20, draw ropes 21 and 22, which serve to advance the cutting machine. The draw ropes 21 and 22 run over guide rollers 21' and 22' disposed on the shafts 9 and 11, in order that the machine will be pressed against the coal seam by the pressure of said draw-ropes and in this manner the guiding of the machine with the straightness of a string along the working face may be achieved.

The housing 1 enclosing the driving unit has surfaces 23 and 24 shaped like ploughshares. The shaping of these surfaces is so selected that the material detached by the cutting devices, or the coal cut out of the coal seam, is shovelled or ejected by said surfaces in the direction of a conveyor belt 25. The region 26 of this ploughshare-shaped surface is disposed almost vertically, so that the coal is displaced from the remaining wall of the coal seam. In the outer region 27 (in Fig. 1, bottom) the surfaces 23 and 24 are arched like ploughshares in such a manner that they shovel up the material detached by the cutting device. In this region bodies having inclined surfaces 28 and 29 are connected to the surfaces 23 and 24 respectively and raise the material during the shovel action of the surfaces 23 and 24 to a determined level. To these inclined surfaces 28 and 29 are connected in turn ploughshare-shaped bodies 30 and 31 respectively, which shovel the material detached by the cutting device to the surface 23 and 24 respectively. During the advance of the cutting machine in the working direction the material is therefore shovelled directly on to the conveyor belt 25.

The mode of operation of the apparatus is as follows:

In the case illustrated in the drawing it is assumed that the machine advances to the right. The cutting chains 4 and 5 and the cutting cylinder 8 disposed on the right then cut into the coal seam 32, thus cutting out a block. The advance is effected by the tension of the rope 21. Depending on the nature of the coal seam the block will break up of its own accord or is broken into fragments by the ploughshare-like surface 23 which is made of steel. In the space 33 between the cutting apparatus and the ploughshare surface 23, the material detached by the cutting device is therefore dammed up, and as the machine continues to advance it is raised by the shovel action of the surface 23 over the inclined surface 28 and on to the conveyor belt 25. The ploughshare-shaped body 30 seizes during this operation the material passing out at the side.

In this way the cutting action of the cutting roller 8 produces a wall of coal 34, against which the rear wall 35 of the housing 1 bears and slides. The roof of the gallery is supported by the usual pit-props 36 and beams 37.

Figure 4:
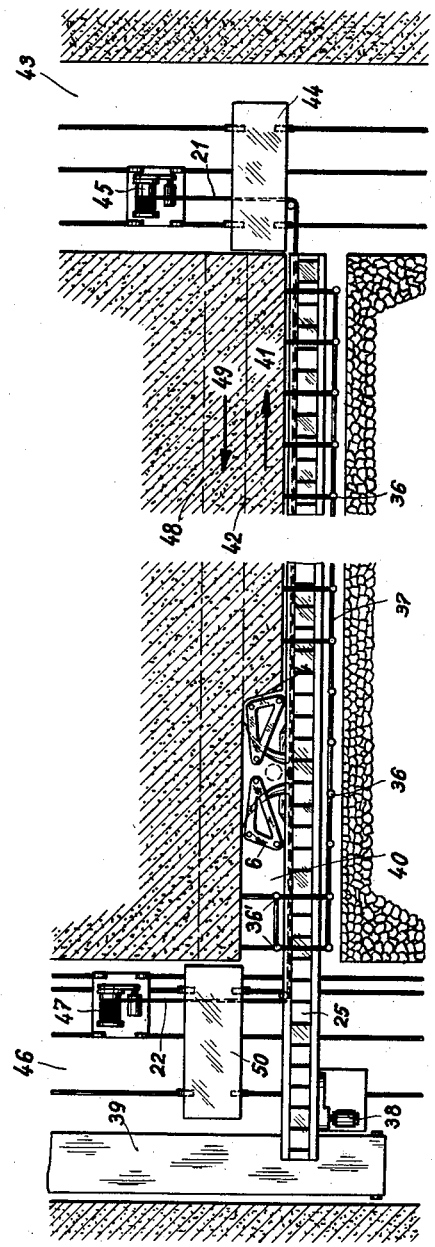
Fig. 4 illustrates the mode of operation of the apparatus.

As is shown in Fig. 4, the conveyor belt 25 is guided directly at the side of the cutting machine over the whole length of the working path of the latter, so that the cutting machine can shovel the material on to the conveyor belt over the whole of its working path. The conveyor belt is driven by a driving unit 38. At the left-hand end the conveyor belt 25 discharges the material on to another conveyor belt 39. In proportion to the advance of the cutting machine over its working path, the gallery is supported by further pit-props 36'. In the space 40 which has just been cut out by the machine, a second conveyor belt similar to the conveyor belt 25 (not shown in the drawing) is constructed from separate parts. When the machine has completed its "up" journey in the direction of the arrow 41, the gallery is cut out to the width indicated by the broken line 42. At the end of its working path the machine passes on to a slide 44 in the cross-gallery 43, and on this slide it is displaced by its working width. The winch 45 hitherto required for the advance of the machine, which has drawn in the draw-rope 21, is now put out of action, and the winch 47 provided in the left-hand cross-gallery 46 is connected. Under the pull of the left-hand rope 22 the machine then carries out its next working trip in the region between the broken lines 42 and 48 of the arrow 49, which indicates the "down" journey. At this moment the second conveyor belt erected in the space 40 is already completed, so that the machine now runs directly at the side of this second conveyor belt, and the material now detached by the left-hand cutting machine 6, 7, 10 is shovelled by the ploughshare-like housing surface 24 over the inclined surface 29 on to the belt.

During the "down" journey the first conveyor belt 25 is removed and re-erected behind the machine, so that when the machine has completed its "down" journey and been moved by the slide 50 into its new working position, the next "up" journey can be made in similar fashion. This is repeated until the coal seam has been fully worked.

The height of the cutting machine depends on the height of the coal seam. If desired, the height of the cutting machine may be adjustable.

The invention permits a substantial increase of the output of the miners per man and per shift, which is estimated to amount on the average to 100 to 300 per cent. At the same time the physical work is considerably lightened by the elimination of drilling, wedge-picking, pick-hammering, and in particular loading work, which is the most strenuous of all underground work. This results in a very substantial reduction of production costs for coal which, depending on local conditions, may be estimated at 50 to 75 per cent of former production costs for the mines in question. In addition, there is also a considerable increase in the safety of miners on those working faces in the coal mines which are equipped with machines of this type, through the complete elimination of dangerous blasting work, particularly in mines where fire-damp is present.

What I claim is:

1. In a mining machine, a cutter unit, a driving unit for driving said cutter unit, said driving unit being disposed in a casing covering said driving unit and being formed in a ploughshare-like shape, acting as a deflector for conveying away sidewise the material detached by said cutter unit, the outer limits of said casing arranged wholly within the outer limits of said cutter unit, a triangular lower arm articulated to the lowest part of the said casing, a triangular upper arm articulated to the uppermost part of the said casing, cutting chains guided on the circumference of the said lower and upper triangular arms, a rotating cutter bar connecting two corresponding corners of the said lower and upper triangular arms, means for establishing a driving connection between said driving unit, said cutting chains and cutter bar comprising a vertical gear shaft, and means for advancing the said mining machine.

2. In a mining machine according to claim 1, a second cutter unit arranged behind the said casing, the said casing being designed symmetrically to a plane lying transversally to the direction of advance so that the machine may be advanced in both directions.

3. In a mining machine, a cutter unit, a driving unit for driving said cutter unit, the said driving unit being disposed in a casing covering said driving unit and being formed in a ploughshare-like shape, acting as a deflector for conveying away sidewise the material detached by said cutter unit, the outer limits of said casing arranged wholly within the outer limits of said cutter unit, a triangular lower arm articulated to the lowest part of the said casing, a triangular upper arm articulated to the uppermost part of the said casing, cutting chains guided on the circumference of the said lower and upper triangular arms, a rotating cutter bar connecting two corresponding corners of the said lower and upper triangular arms, means for establishing a driving connection between the said driving unit and the said cutting chains and cutter bar comprising a vertical gear shaft, the lower and upper triangular arms being articulated to said casing in the axis of said vertical gear shaft, and means for advancing the said mining machine.

4. In a mining machine, a cutter unit, a driving unit for driving said cutter unit, the said driving unit being disposed in a casing covering said driving unit and being formed in a ploughshare-like shape, acting as a deflector for conveying away sidewise the material detached by said cutter unit, the outer limits of said casing arranged wholly within the outer limits of said cutter unit, a guide surface near the floor and joining the said ploughshare-like shaped casing and rising obliquely outwards over the height of an adjoining converter belt, arranged aside of the path of the said cutter unit, a triangular lower arm articulated to the lowest part of the said casing, a triangular upper arm articulated to the uppermost part of the said casing, cutting chains guided on the circumference of the said lower and upper triangular arms, a rotating cutter bar connecting two corresponding corners of the said lower and upper triangular arms, means for establishing a driving connection between the said driving unit and the said cutting chains and cutter bar comprising a vertical gear-shaft, and means for advancing the said mining machine.

LADISLAUS FRANZ TRENCZAK.

REFERENCES CITED

The following references are of record in the file of this patent:

UNITED STATES PATENTS

| Number | Name | Date |
|---|---|---|
| 1,497,692 | Morgan | June 17, 1924 |
| 1,563,153 | Brackett et al. | Nov. 24, 1925 |
| 1,565,376 | Levin | Dec. 15, 1925 |
| 2,093,448 | Joy | Sept. 21, 1937 |

FOREIGN PATENTS

| Number | Country | Date |
|---|---|---|
| 595,623 | Great Britain | Dec. 10, 1947 |